(12) United States Patent
Demiya

(10) Patent No.: US 8,503,241 B2
(45) Date of Patent: Aug. 6, 2013

(54) ELECTRONIC APPARATUS AND DATA READING METHOD

(75) Inventor: Takehiko Demiya, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 13/094,694

(22) Filed: Apr. 26, 2011

(65) Prior Publication Data

US 2012/0026795 A1 Feb. 2, 2012

(30) Foreign Application Priority Data

Jul. 30, 2010 (JP) ................................. 2010-172742

(51) Int. Cl.
*G11C 11/34* (2006.01)

(52) U.S. Cl.
USPC ................... 365/185.12; 365/235; 365/238.5; 365/185.33; 365/185.11; 365/230.03

(58) Field of Classification Search
USPC ................... 365/185.12, 235, 238.5, 185.33, 365/185.11, 230.03
See application file for complete search history.

(56) References Cited

U.S. PATENT DOCUMENTS 7,149,116 B2 * 12/2006 Sakuma et al. .......... 365/185.14

FOREIGN PATENT DOCUMENTS

| JP | 2004-078902 | 3/2004 |
| JP | 2004-326165 | 11/2004 |
| JP | 2007-280108 | 10/2007 |

* cited by examiner

*Primary Examiner* — Jason Lappas
(74) *Attorney, Agent, or Firm* — Blakely, Sokoloff, Taylor & Zafman LLP

(57) ABSTRACT

In one embodiment, there is provided an electronic apparatus. The apparatus includes: a storage device including a plurality of blocks that are units of data erasure. Each of the blocks includes a plurality of pages that are units of data reading or writing. Each of the pages includes: a data area storing a data; and a redundant area storing order information indicating an order of the data stored in the data area. The apparatus further includes: a reading module configured to read the data stored in the data area of each of the pages, in order from a last page to a head page, wherein, in reading each of the pages, the reading module is configured to read the order information stored in the redundant area prior to reading the data stored in the data area; a determining module configured to determine whether currently-read order information coincides with already-read order information; and a reading controller configured to control the reading module such that a data is not read from a data area of a page storing the currently-read order information, when the determining module determines that the currently-read order information coincides with the already-read order information.

12 Claims, 6 Drawing Sheets

ELECTRONIC APPARATUS AND DATA READING METHOD

This application claims priority from Japanese Patent Application No. 2010-172742, filed on Jul. 30, 2010, the entire contents of which are hereby incorporated by reference.

BACKGROUND

1. Field

Embodiments described herein generally relates to an electronic apparatus and a data reading method.

2. Description of the Related Art

With the recent technological developments, the capacity and the life of semiconductor storage devices have been increased. Such semiconductor storage devices as a NAND flash memory have a unit of data erasure called a block. The number of times the erasure of data stored in each block is allowable has an upper limit; if data erasure is performed on a block beyond the allowable number of times, the block may be deteriorated into a defective block. That is, as data erasure is performed repeatedly on a block, the remaining number of times the block can be subjected to data erasure decreases (its remaining life becomes shorter).

A technique for elongating the life of a semiconductor storage device in known in which to decrease the number of times of data erasure of each block, an improvement is made in the manner of writing, to a block, data that is partially different from data currently stored in the block.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

According to exemplary embodiments of the present invention, there is provided an electronic apparatus. The apparatus includes: a storage device including a plurality of blocks that are units of data erasure. Each of the blocks includes a plurality of pages that are units of data reading or writing. Each of the pages includes: a data area storing a data; and a redundant area storing order information indicating an order of the data stored in the data area. The apparatus further includes: a reading module configured to read the data stored in the data area of each of the pages, in order from a last page to a head page, wherein, in reading each of the pages, the reading module is configured to read the order information stored in the redundant area prior to reading the data stored in the data area; a determining module configured to determine whether currently-read order information coincides with already-read order information; and a reading controller configured to control the reading module such that a data is not read from a data area of a page storing the currently-read order information, when the determining module determines that the currently-read order information coincides with the already-read order information.

An embodiment of the present invention will be hereinafter described with reference to the drawings.

Figure 1:
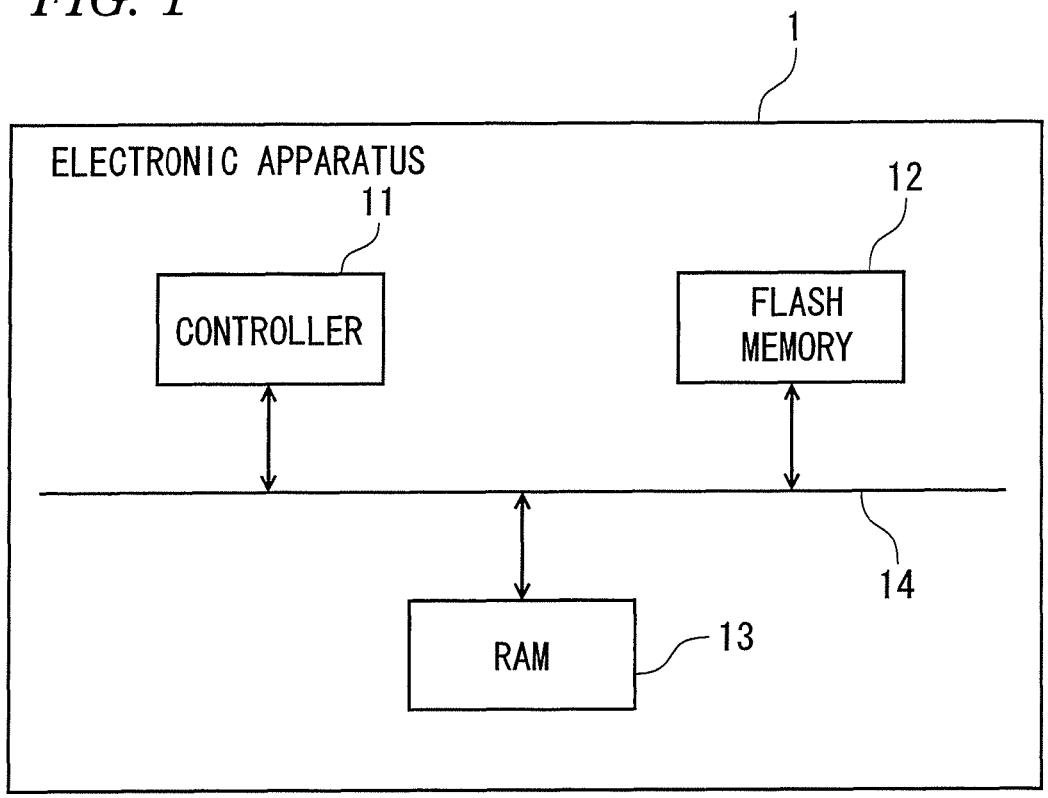
FIG. 1 is a block diagram showing an example internal configuration of an electronic apparatus according to an embodiment of the present invention.

FIG. 1 is a block diagram showing an example internal configuration of an electronic apparatus 1 according to the embodiment. As shown in FIG. 1, the electronic apparatus 1 is equipped with a controller 11, a flash memory 12, a RAM 13, and a bus 14.

The electronic apparatus 1 is a personal computer and has a function of performing various kinds of computation. Although the embodiment is directed to the personal computer, the embodiment of the invention is not limited to such a case and can also be applied to various electronic apparatus such as digital TV receivers, cell phone, and home electronics appliances incorporating a microcomputer.

The controller 11 is a CPU (central processing unit) which controls the whole of the electronic apparatus 1. The controller 11 has a function of running a program and thereby performing prescribed processing according to the program. The controller 11 can also read information from various storage media and write information to the various storage media.

The flash memory 12 is a nonvolatile semiconductor storage device such as a NAND flash memory. In the embodiment, the flash memory 12 is stored with data that are used by the CPU 11 when, for example, the electronic apparatus 1 is booted or any of various programs is run. The detailed configuration of the flash memory 12 will be described later with reference to FIG. 2.

The RAM (random access memory) 13 is a volatile semiconductor storage device such as an SDRAM (synchronous DRAM) which can be subjected to random reading with address designation. The RAM 13 is used as a data development area or the like when the CPU 11 performs any of various kinds of information processing.

The bus 14 has a function of interconnecting the individual modules connected to it such that they can communicate with each other.

Figure 2:
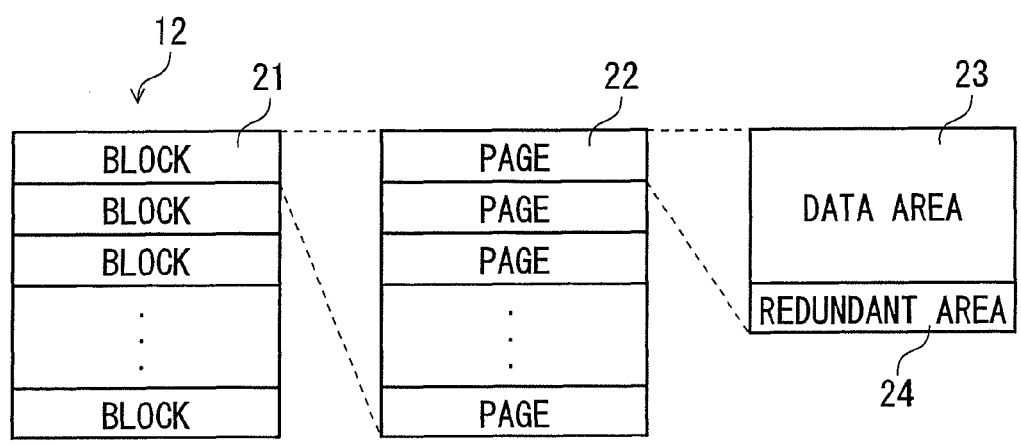
FIG. 2 is a conceptual diagram illustrating part of the internal configuration of a flash memory used in the embodiment of the invention.

FIG. 2 is a conceptual diagram illustrating part of the internal configuration of the flash memory 12 used in the embodiment.

The flash memory 12 is composed of plural blocks 21 which are units of erasure of stored data.

Each block 21 is composed of plural pages 22. The page 22 is a unit of data reading and writing of the flash memory 12.

Each page 22 is composed of a data area 23 and a redundant area 24. The data area 23 is an area to which data the electronic apparatus 1 is going to store in the flash memory 12 is written. The redundant area 24 is an area to which data such as metadata relating to the data area 23 is written.

In the embodiment, the capacity of each page of the flash memory 12 is 528 bytes and each block 21 is composed of 32 pages 22. However, the embodiment of he invention is not limited to such a case; the capacity of each page 22 and the number of pages 22 that constitute each block 21 may have other values.

In such semiconductor storage devices as a NAND flash memory, data overwriting cannot be performed directly on a page that is already stored with data. When it is desired to perform data overwriting on only a certain page 22 of a block 21, it is necessary to erase all the data stored in the block 21 and then write the overwriting-intended data. In such semiconductor storage devices as a NAND flash memory, the number of times of data erasure and the number of times of data overwriting have upper limits (they have limited lives) because they are deteriorated by data erasure and overwriting. If the scheme were employed in which data is written to a certain page 22 of a block 21 after erasing all the data stored in the block 21, the number of times of data erasure and the number of times of data overwriting would be increased at fast rates and the remaining life of the flash memory 12 would be shortened.

In view of the above, in the embodiment, data is written to the flash memory 12 by a method that is partially different from the above writing method. Next, a data writing operation that is performed according to the embodiment will be described.

Figure 3A:
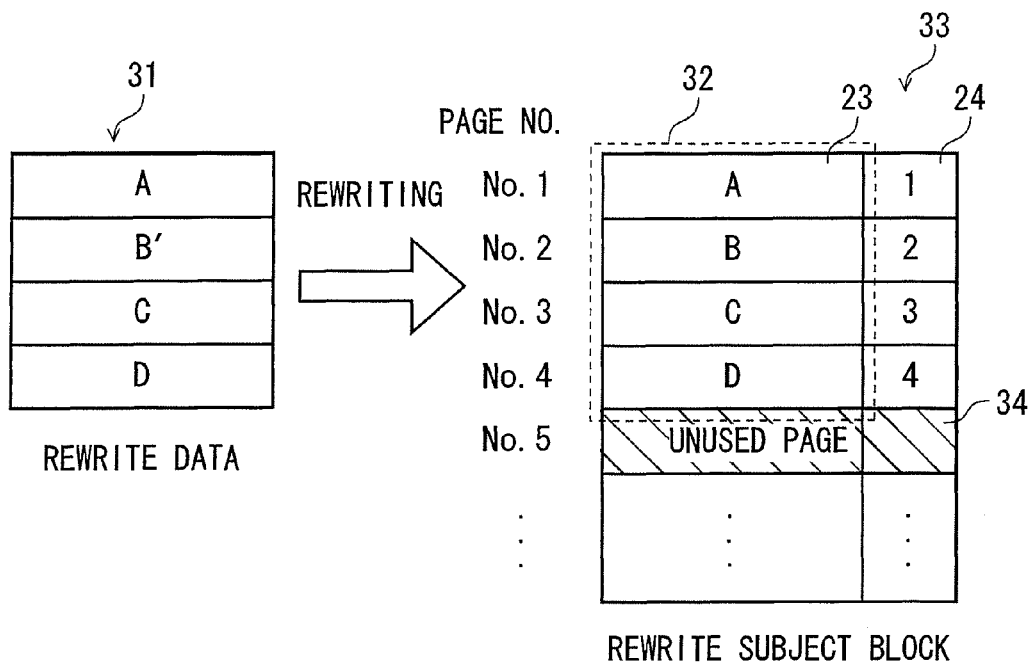
FIGS. 3A and 3B are schematic diagrams illustrating an example data writing operation performed in the embodiment of the invention.
Figure 3B:
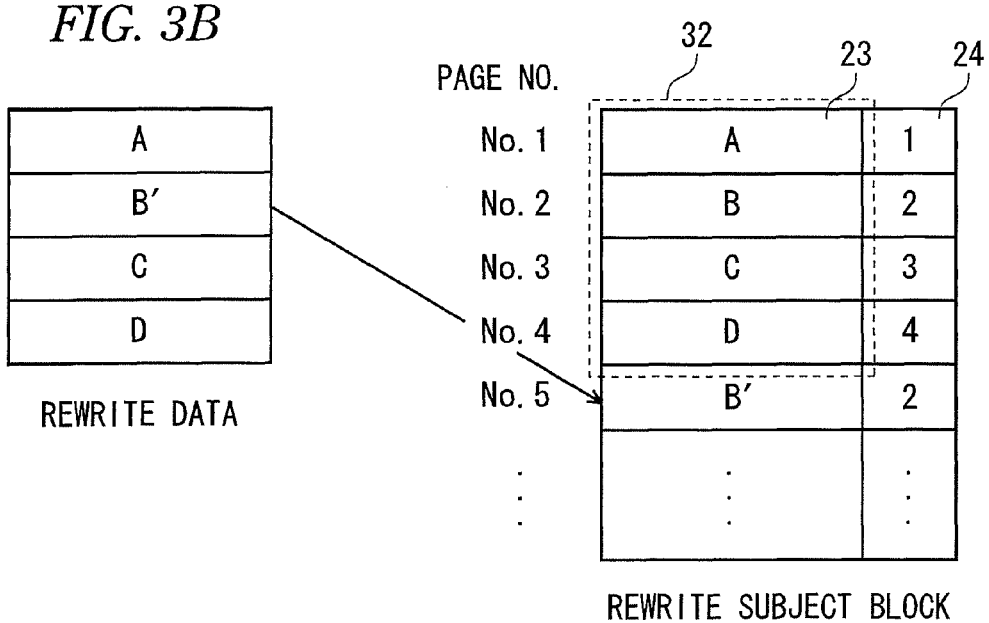

FIGS. 3A and 3B are conceptual diagrams illustrating an example data writing operation according to the embodiment.

First, consideration will be given to a case of FIG. 3A that data 32 is stored in a prescribed block of the flash memory 12 and rewrite data 31 that is partially different from the data 32 is to be written to the same block.

A rewrite subject block 33 shown in the right part of FIG. 3A will be described first.

The data 32 is stored in four continuous pages 22 of the rewrite subject block 33. Parts of the data 32 that are stored in the head page, the second page, the third page, and the last page will be referred to as data A, data B, data C, and data D, respectively. Pieces of data order information of the data 32 are stored at prescribed locations in the redundant areas 24 of the pages 22 having the data areas 23 where data A-D are stored. That is, order information "1" is stored in the redundant area 24 of the page 22 having the data area 23 where data A is stored. And pieces of order information "2" to "4" are stored in this ascending order in the redundant areas 24 of the next and following pages 22.

The block 33 in which the data 32 is stored has an unused page 34 (stored with no data) that follows the page 22 where data D is stored. The unused page 34 need not be subjected to block-by-block erasure and data can be written there.

Rewrite data 31 shown in the left part of FIG. 3A is partially different from the data 32. More specifically, the rewrite data 31 have data B' which is different from data B of the data 32 as well as data A, C, and D which are the same as those of the data 32.

If the rewrite data 31 were to replace the data 32 without using the writing method according to the embodiment, it would be necessary to write the data 31 after erasing all the data stored in the block 33 where the data 32 is stored. This shortens the remaining life of the block 33.

FIG. 3B is a conceptual diagram illustrating the data writing method according to the embodiment.

Data rewriting need not be performed for data A, C, and D of the rewrite data 31 because they are the same as those of the data 32; data A, C, and D that are stored in the block 3 as parts of the data 32 can be used in data reading. On the other hand, data rewriting needs to be performed for data B' because it is not stored in the block 33 before rewriting. Therefore, the controller 11 (or a controller of the flash memory 13) writes data B' of the rewrite data 31 to the unused page 34 of the block 33 that follows the page 22 where data D is stored. Furthermore, the controller 11 writes the order information "2" corresponding to data B and data B' in the redundant area 24 of the page 34. As a result, all the data constituting the rewrite data 31 have been written to the block 33. The whole of the data 32 remains in the block 33 and hence can be read out.

Next, the procedure of a writing process will be described.

Figure 4:
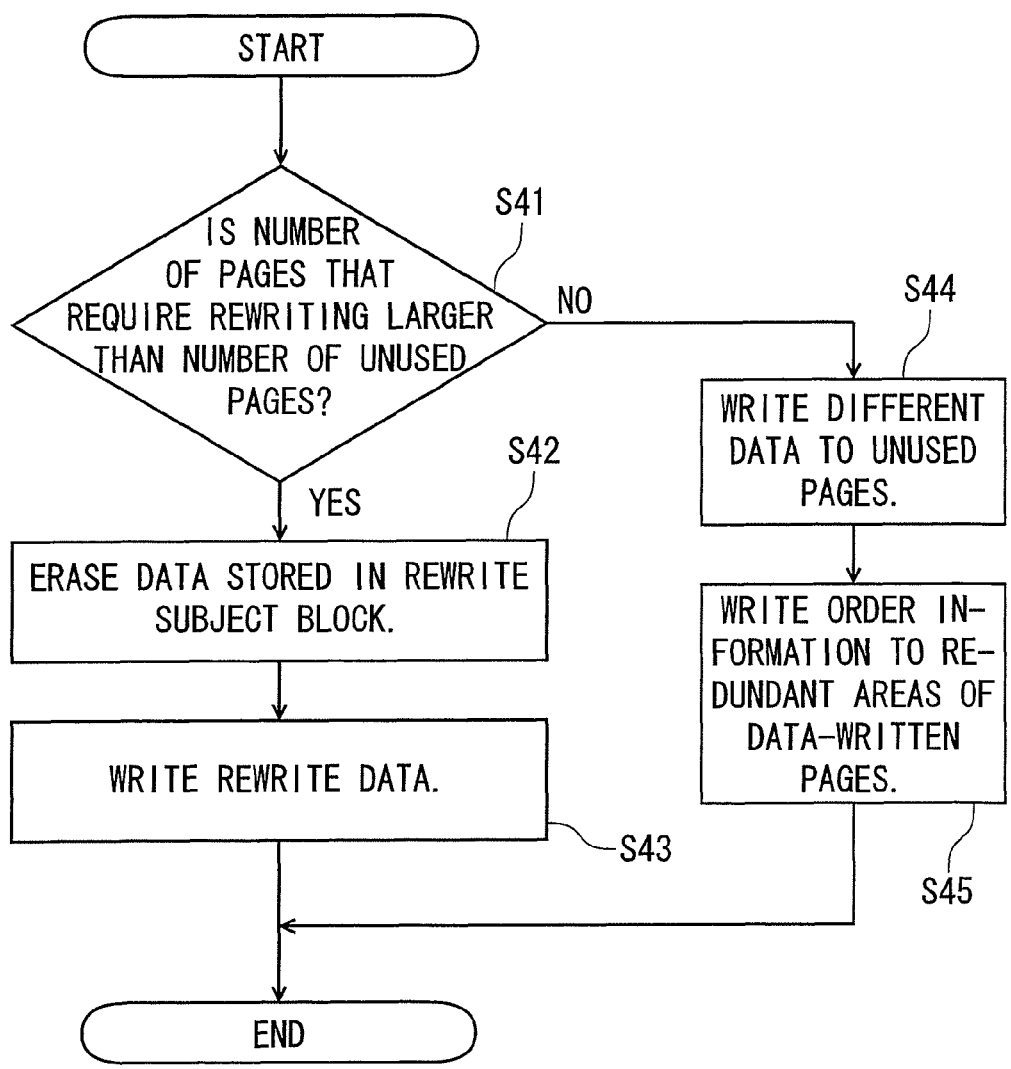
FIG. 4 is a flowchart of an example write process for the flash memory according to the embodiment of the invention.

FIG. 4 is a flowchart of an example writing process for the flash memory 12 according to the embodiment.

To rewrite data stored in the flash memory 12, first, at step S41, the controller 11 detects in how many number of pages 22 of a rewrite subject block 33 stored data is different from corresponding data of rewrite data 31, that is, detects the number of pages 22 that need to be subjected to data rewriting, and determines whether or not the detected number of pages 22 is larger than the number of unused pages 34 of the rewrite subject block 33.

If it is determined that the number of pages that require rewriting is larger than the number of unused pages 34 of the rewrite subject block 33 (S41: yes), the controller 11 erases the data stored in the rewrite subject block 33 at step S42 and writes the rewrite data 31 to the rewrite subject block 33 at step S43.

If it is determined that the number of pages that require rewriting is smaller than or equal to the number of unused pages 34 of the rewrite subject block 33 (S41: no), the controller 11 writes data of the rewrite data 31 that are different from corresponding data stored in the rewrite subject block 33 at step S44 and writes pieces of order information corresponding to the data thus written to redundant areas 24 of pages 22 to which the data have been written at step S45.

When step S43 or step S45 has been executed, the writing process is finished.

Next, a reading operation which is performed according to the embodiment will be described.

Figure 5:
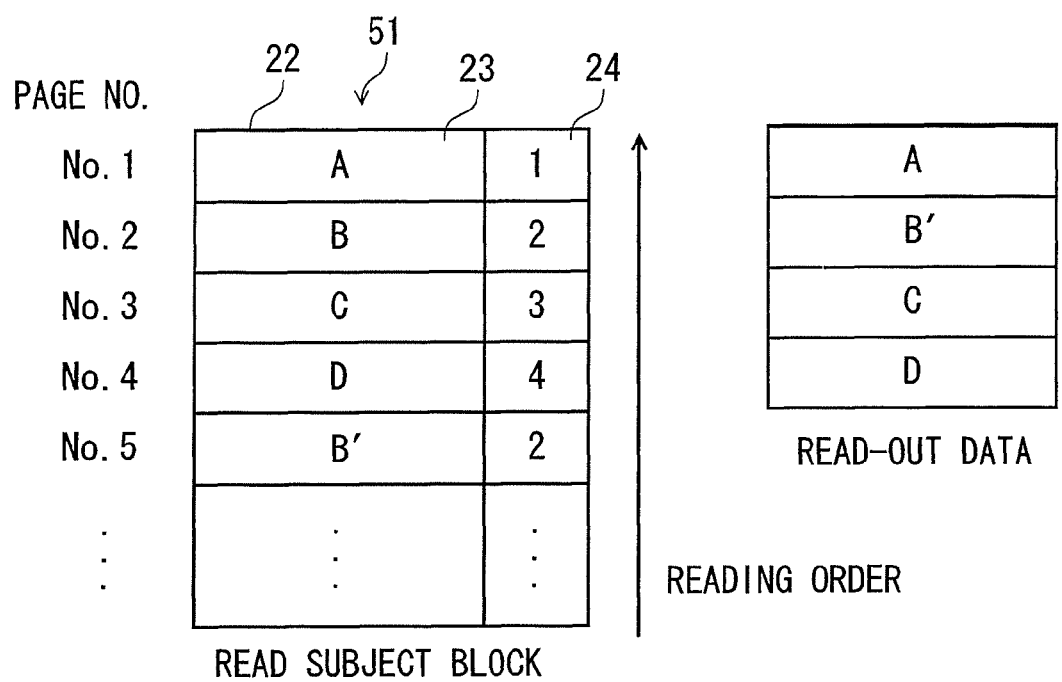
FIG. 5 is a conceptual diagram illustrating an example reading operation which is performed on a block that was subjected to a writing operation, according to the embodiment of the invention.

FIG. 5 is a conceptual diagram illustrating an example reading operation which is performed on a block that was subjected to a writing operation according to the embodiment.

In the embodiment, to read the data from a read subject block 51, the controller 11 reads the data in descending order of the page numbers of pages 22 that are stored with data (starting from the last page 22). When data is read from each page 22, reading is performed on its redundant area 24 first and then on its data area 23.

More specifically, first, the controller 11 performs reading on the redundant area 24 of the last page 22 and thereby acquires order information of the last page 22. Then, the controller 11 reads data from the data area 23 of the last page 22. The controller 11 reads data from the pages 22 in order while rearranging the read-out data according to pieces of order information acquired so far.

When data reading on a certain page 22 has been completed, data is read from the next page whose page number is smaller than the previous page number by one. This operation is performed until data is read from the head page 22. If order information stored in the redundant area 24 of a certain page 22 is the same as order information of a page that was subjected to data reading, data is not read from the data area 23 of this page 22. With this measure, rewritten data can be generated without reading pre-rewriting data.

Next, the procedure of a reading process according to the embodiment will be described.

Figure 6:
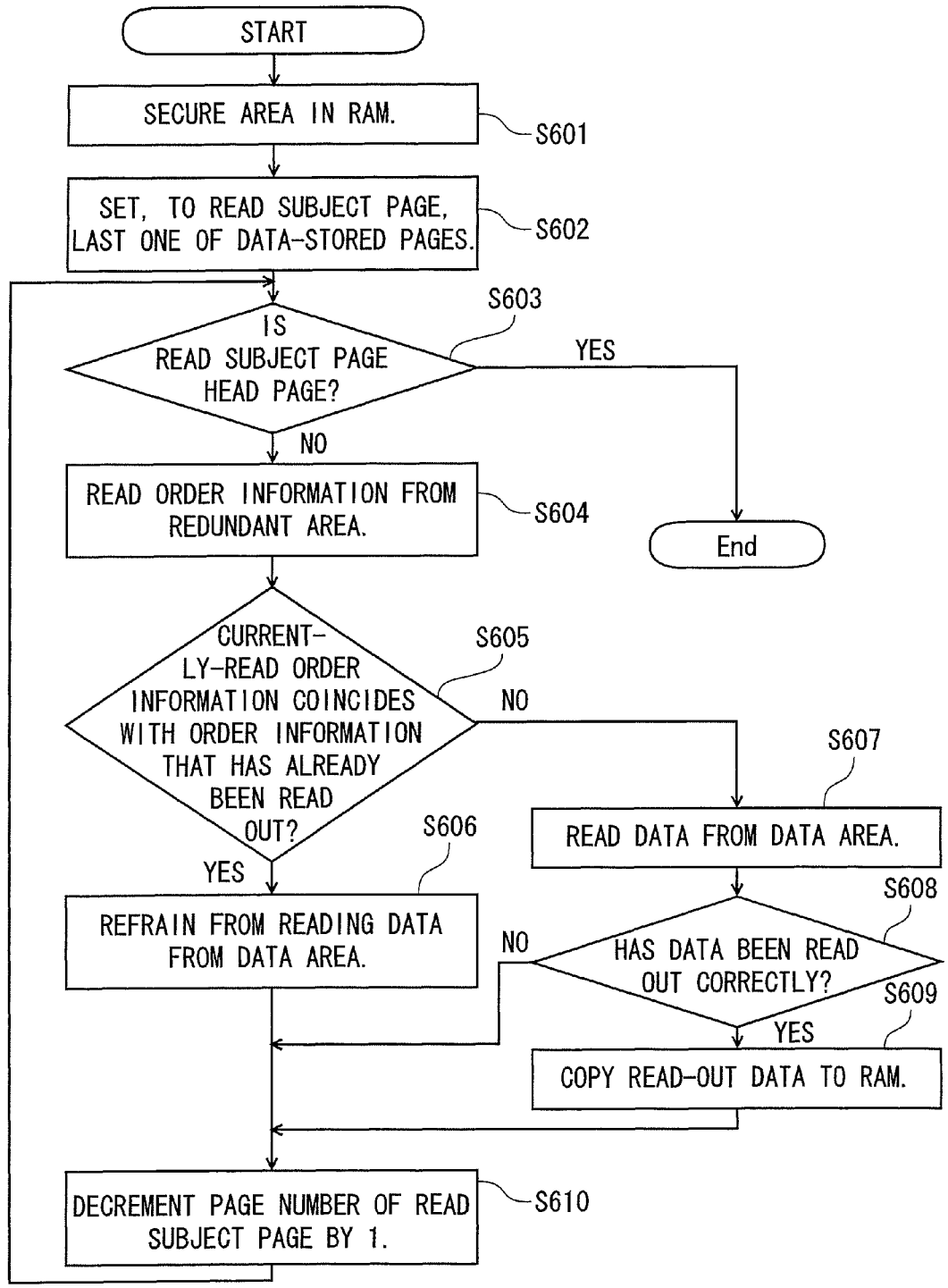
FIG. 6 is a flowchart of an example reading process according to the embodiment of the invention.

FIG. 6 is a flowchart of an example reading process according to the embodiment.

In the embodiment, the controller 11 (reading module) reads data from the flash memory 12. To read data from the flash memory 12, first, at step S601, the controller 11 secures an area in the RAM 13 as a storage destination of read-out data.

At step S602, the controller 11 sets, to a read subject page, the last one of data-stored pages 22 of a read subject block.

At step S603, the controller 11 determines whether or not the read subject page is the head page 22 of the read subject block.

If the read subject page is not the head page 22 (S603: no), at step S604 the controller 11 reads data from the redundant area 24 of the read subject page.

At step S605, the controller 11 detects order information corresponding to data stored in the data area 23 of the read subject page from the data that was read from the redundant area 24 at step S604. Then, the controller 11 (determining module) determines whether or not the detected order information coincides with order information of data that has already been read out (and stored in the RAM 13).

If coincidence is found (S605: yes), at step S606 the controller 11 (reading control means) refrains from reading data from this data area 23 by controlling the reading. As a result, the controller 11 does not read data other than latest data among post-rewriting data, whereby the amount of reading processing can be reduced and the speed of reading processing can be increased. Furthermore, the controller 11 can perform reading processing at high speed with a small processing amount without the need for referring to a separately generated table or the like. Still further, no resources are allocated to generation, use, etc. of such a table.

If coincidence is not found (S605: no), at step S607 the controller 11 reads data from the data area 23 of the read subject page.

At step S608, the controller 11 determines whether or not data has been read out correctly at step S607.

If it is determined that data has been read out correctly (S608: yes), at step S609 the controller 11 copies the read-out data to the RAM 13. In doing so, the controller 11 rearranges the data that have been read out so far according to the pieces of order information that have been acquired so far.

If it is determined that data has not been read out correctly (S608: no) or when step S609 has been executed, the process moves to step S610. At step S610, the controller 11 decrements the page number of the read subject page by 1.

Example reasons why data is not been read out correctly (S608: no) are that the data was not written correctly because of occurrence of some error during writing and that the stored data itself is defective originally and hence cannot be read out correctly. Where, for example, data that was added in an unused page by rewriting (in the example of FIG. 5, data B') is not read out correctly, data that was effective before the rewriting (in the example of FIG. 5, data B) remains as it is and hence is read out instead of data B'. In the embodiment, since data that was effective before rewriting (in the example of FIG. 5, data B) is not made unusable or erased, it can be restored automatically at the time of reading when data that was added in an unused page by the rewriting (in the example of FIG. 5, data B') is defective. Although in the embodiment whether or not data has been read out correctly is determined only after reading from a data area 23 (S607), the invention is not limited to such a case. For example, whether or not data has been read out correctly is determined may also be determined after reading from a redundant area 24 (S604). Where an error occurring in data writing may be such that data is not written correctly to a redundant area 24 or order information itself is not written. If it is determined at step S604 that data has not been read out correctly, the process moves to step S606.

After execution of step S610, the process returns to step S603. If it is determined that the read subject page is the head page 22 (S603: yes), the controller 11 finishes the reading process.

Rewritten data can be read out correctly by executing the above reading process.

The electronic apparatus 1 according to the embodiment can read data that are stored in such a nonvolatile storage device as the flash memory 12.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

The invention claimed is:

1. An electronic apparatus comprising:
   a storage device comprising:
      a plurality of blocks that are units of data erasure, each of the blocks comprising:
         a plurality of pages that are units of data reading or writing, each of the pages comprising:
            a data area storing a data; and
            a redundant area storing order information indicating an order of the data stored in the data area,
      a reading module configured to read the data stored in the data area of each of the pages, in order from a last page to a head page, wherein, in reading each of the pages, the reading module is configured to read the order information stored in the redundant area prior to reading the data stored in the data area;
      a determining module configured to determine whether currently-read order information coincides with already-read order information; and
      a reading controller configured to control the reading module such that a data is not read from a data area of a page storing the currently-read order information, when the determining module determines that the currently-read order information coincides with the already-read order information.

2. The apparatus of claim 1, wherein once failing to read a data from a certain page, the reading module is configured to not read the data from the certain page.

3. The apparatus of claim 1, wherein order information stored in one of the plurality of pages coincides with order information stored in another one of the plurality of pages.

4. The apparatus of claim 1, further comprising:
   a random access memory (RAM) configured to store data read from the storage device therein.

5. A method of reading data from a storage device that includes: a plurality of blocks that are units of data erasure, each of the blocks including: a plurality of pages that are units of data reading or writing, each of the pages including: a data area storing a data; and a redundant area storing order information indicating an order of the data stored in the data area, the method comprising:
   (a) reading the data stored in the data area of each of the pages, in order from a last page to a head page, such that the order information stored in the redundant area is read prior to reading the data stored in the data area;
   (b) determining whether currently-read order information coincides with already-read order information; and (c) refraining from reading a data from a data area of a page storing the currently-read order information, if determining that the currently-read order information coincides with the already-read order information.

6. The method of claim 5, wherein step (a) comprises: aborting reading a data from a certain page once failing to read the data from the certain page.

7. The method of claim 5, wherein order information stored in one of the plurality of pages coincides with order information stored in another one of the plurality of pages.

8. The method of claim 5, further comprising:
(d) storing data read from the storage device in a random access memory (RAM).

9. A computer-readable medium storing a program for causing the computer to perform operations to read data from a storage device that includes: a plurality of blocks that are units of data erasure, each of the blocks including: a plurality of pages that are units of data reading or writing, each of the pages including: a data area storing a data; and a redundant area storing order information indicating an order of the data stored in the data area, the operations comprising:
(a) reading the data stored in the data area of each of the pages, in order from a last page to a head page, such that the order information stored in the redundant area is read prior to reading the data stored in the data area;
(b) determining whether currently-read order information coincides with already-read order information; and
(c) refraining from reading a data from a data area of a page storing the currently-read order information, if determining that the currently-read order information coincides with the already-read order information.

10. The computer-readable medium of claim 9,
wherein operation (a) comprises: aborting reading a data from a certain page once failing to read the data from the certain page.

11. The computer-readable medium of claim 9, wherein order information stored in one of the plurality of pages coincides with order information stored in another one of the plurality of pages.

12. The computer-readable medium of claim 9, wherein the operations further comprises:
(d) storing data read from the storage device in a random access memory (RAM).

* * * * *